United States Patent [19]

Hannon et al.

[11] Patent Number: 4,592,475
[45] Date of Patent: Jun. 3, 1986

[54] PLASTIC CLOSURE WITH MECHANICAL PILFER-PROOF

[75] Inventors: Charles N. Hannon, 27 Sargent Rd., Scarsdale, N.Y. 10583; Leonard J. Vallender, Valhalla, N.Y.

[73] Assignee: Charles N. Hannon, Scarsdale, N.Y.

[21] Appl. No.: 679,706

[22] Filed: Dec. 10, 1984

Related U.S. Application Data

[63] Continuation-in-part of Ser. No. 447,284, Dec. 6, 1982, abandoned.

[51] Int. Cl.⁴ .................................................. B65D 41/34
[52] U.S. Cl. .................................................. 215/252
[58] Field of Search .................................... 215/252

[56] References Cited

U.S. PATENT DOCUMENTS

| | | | |
|---|---|---|---|
| 3,463,341 | 8/1969 | Fields | 215/252 |
| 3,861,551 | 1/1975 | Hannon | 215/252 |
| 3,924,769 | 12/1975 | Fillmore | 215/253 |
| 4,147,268 | 4/1979 | Patel et al. | 215/253 |
| 4,190,169 | 2/1980 | Pehr | 215/252 |
| 4,196,818 | 4/1980 | Brownbill | 215/252 |
| 4,206,851 | 6/1980 | Ostrowsky | 215/246 |
| 4,241,842 | 12/1980 | Toeppen | 215/252 |
| 4,299,328 | 11/1981 | Ochs et al. | 215/252 |
| 4,394,918 | 7/1983 | Grussen | 215/253 |
| 4,398,645 | 8/1983 | Toeppen | 215/252 |
| 4,401,227 | 8/1983 | Pehr | 215/252 |
| 4,402,418 | 9/1983 | Ostrowsky | 215/252 |
| 4,488,655 | 12/1984 | Itsubo et al. | 215/252 |

FOREIGN PATENT DOCUMENTS

| | | |
|---|---|---|
| 49876 | 4/1982 | European Pat. Off. ............ 215/252 |
| 2704461 | 8/1978 | Fed. Rep. of Germany . |
| 3025751 | 2/1982 | Fed. Rep. of Germany . |
| 1213931 | 11/1959 | France . |
| 2290364 | 6/1976 | France . |
| 2300715 | 9/1976 | France . |
| 2306136 | 10/1976 | France . |
| 2339541 | 8/1977 | France . |
| 2421812 | 11/1979 | France . |
| 2490598 | 3/1982 | France . |
| 56-74445 | 6/1981 | Japan . |
| 2034674 | 1/1980 | United Kingdom . |
| 2033350 | 5/1980 | United Kingdom . |
| 2096114 | 10/1982 | United Kingdom . |

*Primary Examiner*—Donald F. Norton
*Attorney, Agent, or Firm*—Donald P. Gillette

[57] ABSTRACT

A plastic pilfer-proof that comprises a ring, a plurality of inwardly directed hooks joined to one edge of the ring by hinge portions, and a weakened region is integrally molded with a main closure portion comprising a closed end and a skirt extending from the closed end and having an edge to which the pilfer-proof is attached during the molding. The hooks define sectors of a generally frusto-conical shell and extend inwardly and upwardly toward the closed end from the remote end of the ring. The hooks are released from the mold by rotating a mold portion that forms the respective hidden surfaces of the hooks and by pivoting the hooks radially outwardly toward the respective parts of the inner surface of the ring with respect to which the hidden surfaces are juxtaposed.

16 Claims, 21 Drawing Figures

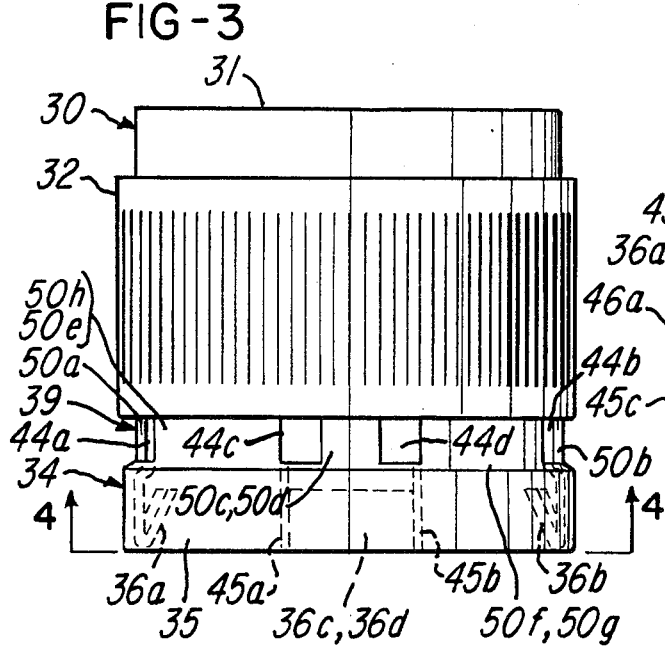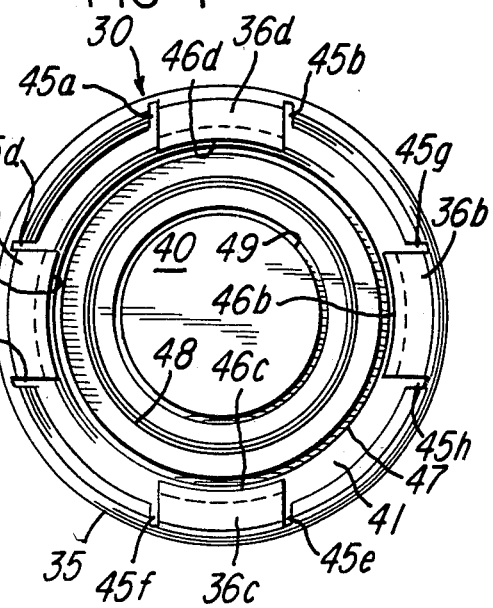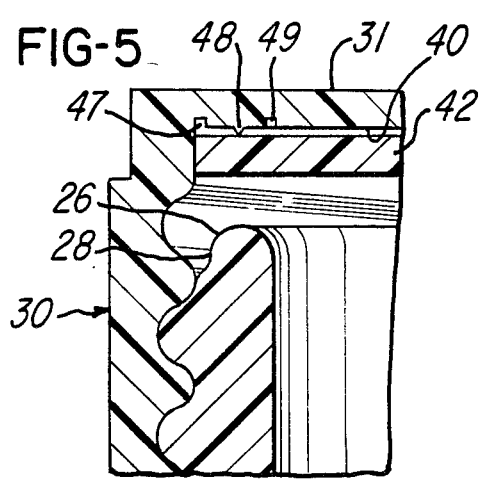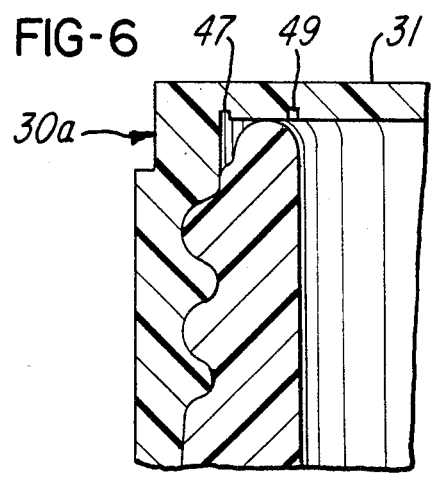

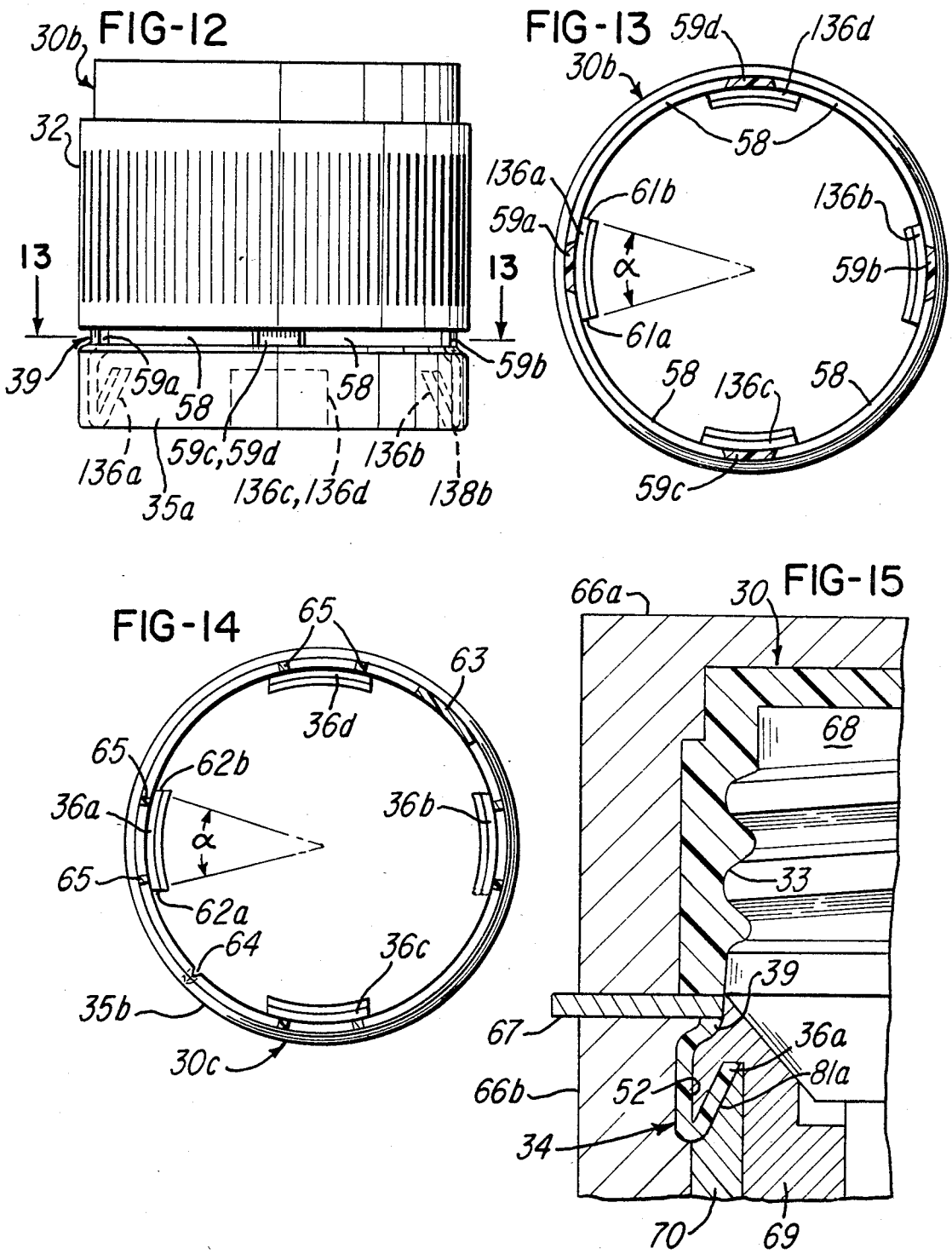

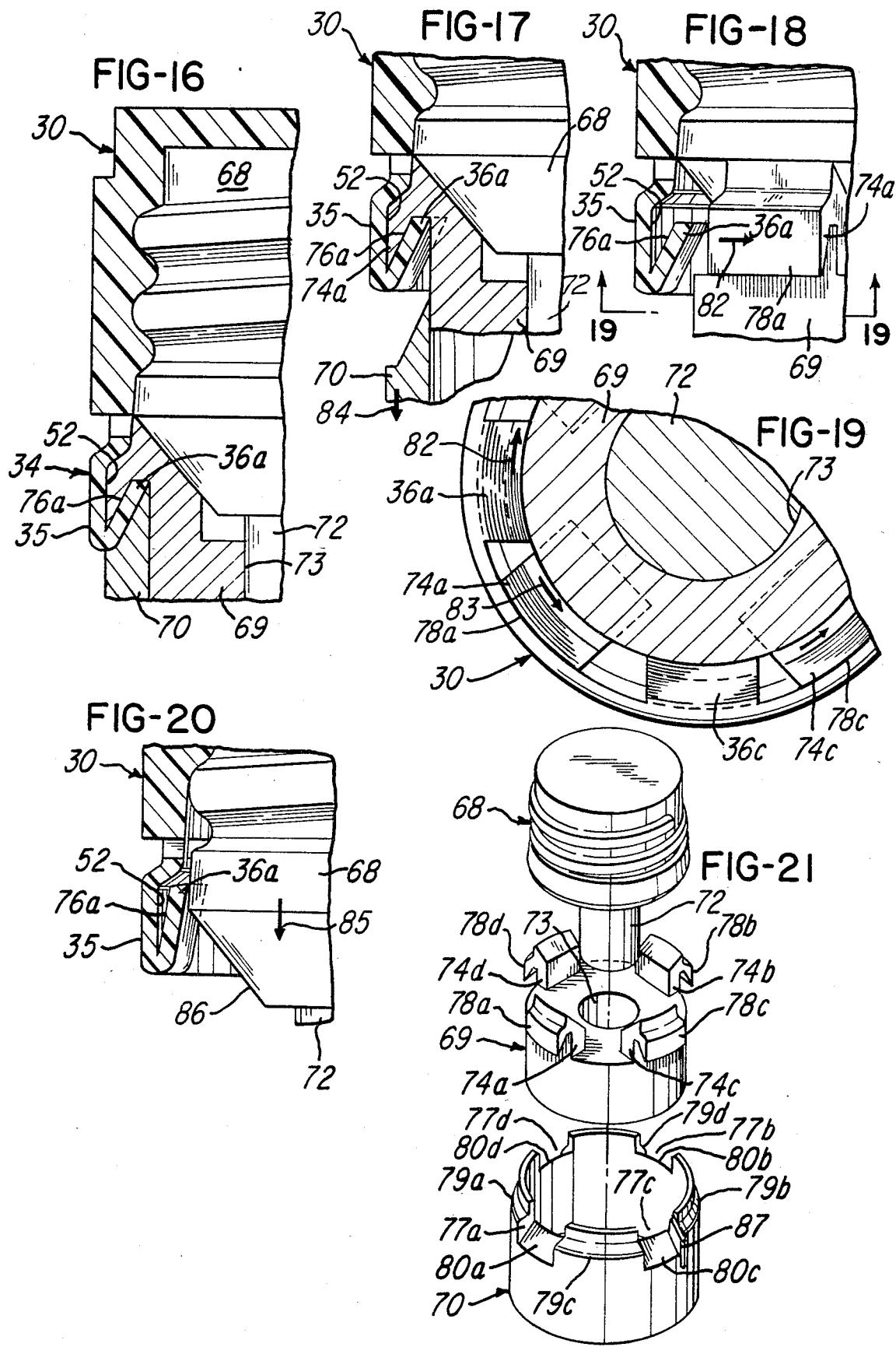

PLASTIC CLOSURE WITH MECHANICAL PILFER-PROOF

This application is a continuation-in-part of patent application Ser. No. 447,284, filed Dec. 6, 1982 and now abandoned.

BACKGROUND OF THE INVENTION

1. Field of the Invention

This invention relates to plastic closures with improved sealing means to seal containers that may have contents capable of generating pressure much higher than atmospheric pressure. In particular, it relates to plastic closures with pilfer-proof structures and to the manufacture of such closures.

2. The Prior Art

At the present time one of the most common types of closures for large beverage containers (about two liters) is made of sheet aluminum and is called a roll-on closure because of the way it is attached to a container. The neck of the container has a bead that extends outwardly at a region spaced about two cm. from the outermost end of the neck and forms a shoulder facing the body of the container. Between the bead and the outermost end of the neck is a thread that stops a short distance from the outermost end.

A roll-on closure is formed by punching out a disk from a sheet of aluminum and forming the disk so that its central part remains flat and is of approximately the same size as the end of the neck of a container of the type just described while its peripheral part is deformed into a generally cylindrical configuration that remains integrally attached to the perimeter of the central part and has an inner diameter approximately equal to the outermost part of the thread and bead on the neck of the container. The forming process also creates two knurled bands that provide gripping surfaces to facilitate removal of the closure after it has been attached to a container in the bottling process.

The designation "roll-on" is derived from the process of attachment in which the closure in the form just described is attached to the end of the neck of a filled container with the cylindrical part of the closure extending down past the threaded part of the neck. The central part is pressed firmly against the end of the neck, and the closure and container are rotated as a unit about their common axis while rollers that rotate about axes approximately parallel to the container axis are pressed against opposite sides of the cylindrical part at the region near the intersection between that part and the flat central part. The cross-sectional shape of the rollers is about the same as the valley in the thread on the neck of the container, and the radially inward pressure by the rollers as they roll along the valley of the rotating container deforms the cylindrical part of the closure to conform to the thread on the container.

The lowermost end of the cylindrical part extends below the bead on the bottle and is also subjected to inwardly directed deforming pressure by rollers that cause the edge of the lowermost end to fit tightly over the shoulder at the axial end of the bead facing the body of the container. This inwardly pressed end of the closure would prevent the closure from being unscrewed from the container except for the fact that, at some time in the formation of the closure, the cylindrical part is lanced by blades to form circumferential slits that almost sever the lowermost end from that portion of the cylindrical part that is deformed into a helical thread. The resulting inwardly pressed end, partially severed from the threaded part, is called the "pilfer-proof" because it prevents the contents of the container from being pilfered or tampered with without leaving a clear indication that the container has been opened. The threaded part of the closure, to which the pilfer-proof is attached, is called the skirt of the closure. The narrow parts that join the pilfer-proof to the skirt are called bridges, and they are defined by the ends of the slits formed by the lancing blades.

One way that the pilfer-proof can indicate tampering is by making the bridges so narrow or weak that they can be easily broken by the stretching force produced when the skirt moves upwardly as the closure in unscrewed. During this removal of the main part of the closure, the inwardly deformed edge of this type of pilfer-proof clings firmly to the downwardly facing shoulder of the bead on the neck of the container. The severed pilfer-proof then falls farther down on the neck and gives clear warning that the closure has been removed, or at least tampered with.

Another type of pilfer-proof, such as that illustrated in U.S. Pat. No. 3,824,921 to Hannon, has longitudinal slits that weaken its inwardly turned edge. When a closure having such a pilfer-proof is unscrewed, the resulting upward pressure causes the scores to rupture so that the sections of the inwardly turned edges can pivot outwardly as the result of camming action by the shoulder on the bead, thus indicating clearly that the closure has been tampered with. The bridges in such a structure are strong enough not to break before the scores rupture.

One of the supposed advantages of a roll-on closure is that it can be removed without the assistance of a mechanical opener, such as is required to remove the old-style crowns (which are still used on some containers). However, that advantage can only be obtained if the thread formed in the skirt is pressed in deeply enough to permit a strong enough longitudinal force to be generated by interaction between that thread and the container thread to sever or tear the pilfer-proof, according to the type of pilfer-proof. Unfortunately, the threads on closures are not always formed deep enough, and on occasion a closure with too shallow a thread will virtually explode off of the container and seriously injure the person trying to unscrew the closure. Such occasions are rare but not rare enough, and for safety, a measuring device of the type described in U.S. Pat. No. 4,135,306 by Charles N. Hannon should be used to measure the thread depth of roll-on closures.

Another supposed advantage of a roll-on closure is its ability to be screwed back onto the container to retain carbonation in the liquid in the container. Unfortunately, and in spite of the fact that a ring or disk of plastic is commonly used as a gasket or liner on the underside of the flat central part of the closure, it is difficult to twist the closure back on firmly enough to re-establish a gas-tight seal between the closure and the container.

For several years attempts have been made to form satisfactory closures by molding thermoplastic material, such as polyethylene or polypropylene or a co-polymer or other thermoplastic material, into a configuration that will seal and reseal a container. A number of types of such plastic closures have been proposed, and some of them have included pilfer-proofs. As in roll-on pilfer-proofs, plastic pilfer-proofs include a ring, gripping means to grip the container securely, and some weakened region that tears the first time the closure is removed from the container. If the closure has been tampered with to an extent that might adversely affect the contents of the container, the weakened region will be torn and thus indicate in two ways that such tampering has occurred: the tear in one or more places gives visible evidence of tampering, and the fact that, after the weakened region has been torn, the closure can be noticeably more easily removed gives tactile evidence.

In general plastic pilfer-proofs have fallen into one or the other of two categories. In one category, the pilfer-proof, or at least the ring, consists of material that shrinks as a result of being heated, which requires filled containers capped by such closures to pass through some sort of heating means, such as a heat tunnel. When everything works properly, the pilfer-proof shrinks around the neck of the container below the bead. Some of the pilfer-proofs of that category are arranged so that all of the bridges will be broken when the main part of the closure is unscrewed, leaving the pilfer-proof as a tell-tale ring on the neck of the container. Others of the heat-shrunk category are formed with a longitudinal groove that weakens the ring so that it will break as the closure is unscrewed and as most of the bridges are also breaking. However, one of the bridges 180° away from the longitudinal groove is made stronger that the other bridges to hold the partially severed pilfer-proof attached to the skirt.

Pilfer-proofs that depend on heat shrinkage have a great disadvantage because heat tunnels are expensive and take up space in a bottling plant. In addition, the amount of heat must be carefully controlled so as to shrink the ring sufficiently without damaging the main part of the closure or the container or the contents of the container.

The other general category of pilfer-proofs, and the type with which this invention deals, is referred to as a mechanical type of pilfer-proof because its shape and resilience cause it to interlock with the container. Like heat-shrunk pilfer-proofs, mechanical pilfer-proofs have been proposed in which the weakened region is a plurality of slender bridges that attach the ring to the lower edge of the skirt. The gripping means consists of a number of projections integrally molded with the ring and arranged to project inwardly and upwardly toward the top of the closure.

In some mechanical pilfer-proofs, the projections are not formed so that they can be moved radially outwardly by the bead when the closure is being put on a container. As a result, either the projections must be compressible enough to be flattened by pressure between the ring and the bead on the neck of the container while the closure is being put on, or else the ring must stretch. Either of those requirements makes it difficult to put the closure on a container and makes it possible for the same resilience to allow the pilfer-proof to come off of the container without the necessary visible damage to the weakened region during removal.

In other types of mechanical pilfer-proofs, the plastic ring has been molded as a separate item and then welded to, or mechanically interlocked with, a separately molded closure, which can then be put on a container. Such a two-part structure requires that the closure be molded in one operation and then separately assembled with the pilfer-proof in a secondary operation that greatly increases the cost of the complete product.

In still other types of pilfer-proofs, the projections are molded as part of the ring, but they are not molded pointing upwardly as well as inwardly and must be folded into that position after the closures with such pilfer-proofs have been molded. The folding step is a secondary operation that adds to the production cost, and at least in some instances, projections thin enough and flat enough to be folded are not rigid enough to be sure that they will not unfold instead of tearing the bridges, as they should do.

One of the most difficult problems in molding gripping means that extend inwardly and at an angle toward the inner surface of the top of the closure is extracting the closures from a mold in which the gripping means are in the form of hooks, each of which has an inaccessible surface that faces generally upwardly and outwardly. One proposal that has been made in the past is to provide, for each such hook, a separate outer mold member that projects inwardly through the ring, itself, to form the inaccessible surface. Each of these mold members in such a complex arrangement must be separately withdrawn in its radial direction, for example, by cam action to allow removal of the molded closure after the elastomeric closure material has solidified.

Plastic closures can be made sufficiently deformable to preclude the necessity of a gasket, but some bottlers still want the liner so that plastic closures can be used in games of chance just like the roll-on closures. In addition, if the entire closure and its mechanical pilfer-proof are to be molded of a single type of plastic, it is desirable, for ease of tearing the weakened region, that the plastic be relatively brittle and not soft and tough. However, relatively brittle thermoplastic material, even when it still retains some of its elastomeric qualities, cannot easily be made deformable enough to act as its own gasket against the end of the neck of the container, and using a separate liner with such a closure makes it easier to achieve satisfactory sealing characteristics and, simultaneously, to achieve satisfactory tamper-evident operation.

Since it is important for closures to be usable with existing bottles, the configuration of the neck portion in common use must be taken into account in arranging the configuration of the pilfer-proof. A typical bottle has a neck with an external thread that extends from a point near the end a short distance toward the main body of the container and terminates at or near a bead that extends radically outwardly about as far as, or usually a little farther than, the outermost part of the thread. The bead has a shoulder that extends inwardly toward the axis of the neck and defines the end of the bead facing the main body of the container. Most, if not all, pilfer-proofs are expected to hook or contract under the shoulder.

On many bottles, there is a flange that extends outwardly from the neck at about the location where the neck begins to merge into the main body of the container. The axial distance between the shoulder of the bead and the flange limits the maximum axial length of the ring of the pilfer-proof and even though some containers do not have such a flange, it is commercially desirable to arrange closures to be as similar as possible and thus to accommodate a flange even when no flange is present. Thus, it is important to form the hooks on the pilfer-proof so that they are attached to the edge of the ring remote from the main part of the closure and so that they extend both upwardly toward the top of the closure and inwardly toward the axis to a region such that, when the closure is screwed onto a container, the tip of each hook will be at or very slightly below the shoulder of the bead so that the closure cannot be appreciably unscrewed without producing a large axial force due to pressure of the hooks on the shoulder.

OBJECTS AND SUMMARY OF THE INVENTION

It is one of the objects of the invention to provide a plastic closure having an improved pilfer-proof.

Another object is to provide a plastic closure molded integrally with an improved mechanical pilfer-proof.

A further object is to provide an improved process for forming a plastic closure molded integrally with a pilfer-proof.

Still another object is to provide means to mold a plastic closure with a mechanical pilfer-proof that can easily be released from the mold.

A still further object is to provide molding means and a method for molding, in a single operation, a closure that has an integrally formed pilfer-proof with inwardly re-entrant projections.

Further objects will be apparent from the following specification and the drawings.

In accordance with this invention, a molded plastic closure that has a main portion consisting of a top and an internally threaded skirt is integrally molded to have a pilfer-proof attached to the edge of the skirt remote from the top. The pilfer-proof includes a ring, or band, and a weakened region that attaches the ring to the lower edge of the skirt. Latching means in the form of re-entrant hooks are molded so that they extend inwardly and upwardly toward the inner surface of the top from the remote edge of the ring.

The weakened region, normally a plurality of bridges, is provided so that the ring can either be torn away from the main part of the closure as the latter is unscrewed, or the ring can be ripped asunder and partially torn from the skirt, or the ring can be torn longitudinally in visible tears while remaining attached to the closure skirt as a plurality of separate flaps. In the latter case, it is important that the outwardly facing surface of the ring be smooth so that any longitudinal tears made when the closure is being removed will be clearly visible.

The hooks are substantially frusto-conical, which makes them relatively stiff longitudinally so that they do not fold in response to the compressive force on them when the closure is unscrewed from the container. Instead, they lock under the bead on the neck of the container and pivot about an axis defined by the intersection between the downwardly facing shoulder on the bead and the adjacent surface of the neck. The ends of the hooks attached to the ring hold fast against the force transmitted through the ring as the closure moves upward on the threaded neck of the container. By providing one or more longitudinal grooves on the inner surface of the ring, the ring is weakened from the inside so that it will tear longitudinally, thus indicating that the closure has been removed. Alternatively, the bridges integrally molded to attach the ring to the skirt can be made weak enough to break as a result of tensile force in them due to removal of the closure.

In order to allow the hooks to move past the bead as the closure is being applied during the bottling process, the hooks must have some flexibility perpendicularly to their longitudinal dimension. However, if the ring is formed with longitudinal weakening grooves, softness in the wrong place would prevent the ring from being torn along those grooves on removal of the closure and would thus negate the purpose of the pilfer-proof. The ring, being at least somewhat elastomeric, will be a little flexible, and although the hooks must not fold during removal of the closure, they will flex a little when the closure is first screwed onto the container. The ring has, at the region facing each hook, an inner surface spaced radially outwardly from the axis of the closure by a distance sufficient to allow the respective hook to be nested against or near that part of the inner surface as the hook is forced downwardly past the bead. Both the outwardly facing surface of the hook, i.e., the surface that faces away from the axis of the closure, and the portion of the ring juxtaposed with respect to the outwardly facing surface of the hook are curved as surfaces of revolution so that the mold in which the pilfer-proof portion is formed can be rotated to free the closure for removal. This permits the mold to be simple in construction with a minimum amount of movement of its parts relative to one another to allow the molded closure to be withdrawn.

BRIEF DESCRIPTION OF THE DRAWINGS

FIG. 3 is a side view of one embodiment of a closure formed according to the invention.

FIG. 4 is a bottom view of the closure in FIG. 3.

FIG. 5 is an enlarged cross-sectional view of a fragment of the closure in FIG. 2.

FIG. 6 is a cross-sectional view of a modified embodiment of the closure in FIG. 2 without a liner.

FIG. 12 is a side view of an embodiment of a closure such as that partially shown in FIG. 10.

FIG. 13 is a cross-sectional view of the closure in FIG. 12 along the section line 13—13.

FIG. 14 is a similar cross-sectional view of another embodiment of a closure.

FIG. 15 is a cross-sectional view of a mold for molding a closure with a pilfer-proof according to the invention.

FIGS. 16–20 show successive stages in the removal of a closure from the mold in FIG. 15.

FIG. 21 is an exploded, perspective view of the mold in FIG. 15.

DETAILED DESCRIPTION OF THE INVENTION

Figure 1:
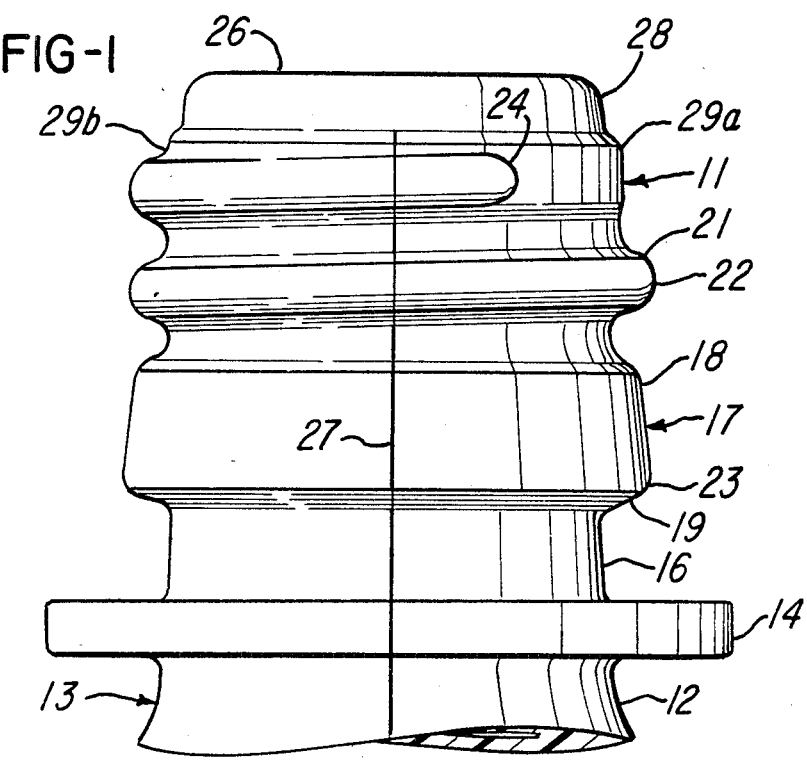
FIG. 1 is a side view of the threaded neck of one type of container with which the closure of this invention can be used.

FIG. 1 shows primarily the neck 11 and a very small part of the main body 12 of a container 13. Between the neck and body is a radially outwardly extending flange 14 that makes it easier to hold containers provided with such a flange. Not all containers are so provided; they are not used on most glass containers of the type used to bottle soft drinks, for example, but they are frequently used on plastic containers, not only because they are used by a mechanism that holds the neck when the body 12 is being blow-molded from a preform.

Immediately above the flange 14 is a neck portion 16 of substantially smaller diameter and above that is a bead 17 that has a main surface 18 and a lower surface 19. The main surface is frusto-conical in shape, while the lower surface forms a shoulder facing the flange 14. In comparison to the surface 18, the surface 19 is much more nearly radial, although it is not necessarily precisely so. The surface 19 on most containers may more accurately be considered to be frusto-conical, although with a much larger included angle than the surface 18, Specifically, the included angle of the surface 19 is about 130° to 160°, although those figures should not be considered as being limitations of the present invention. The annular width of the shoulder 19 is typically about 0.25".

Above the constricted end of the bead 17 is a threaded portion 21 of the neck 11. The outermost part 22 of the thread has approximately the same diameter as the adjacent end of the bead 17 and less than the diameter at the largest region 23 just above the shoulder 19. Typically, the thread consists of less than two helical turns, and it terminates at a location 24 a short distance from the end 26 of the neck. Between the location 24 and the end 26, the outer surface of the neck is approximately cylindrical, although the exact shape is somewhat dependent on whether the container is molded of plastic or glass.

Glass cannot be molded to the same degree of precision as plastic. Most of the neck of a glass container is formed in a mold that is split along a central plane through the axis of the neck. There is almost always a visible parting line 27 on the outer surface of the neck, and if this line continued to the end 26, the slight unevenness would make it difficult to seal the container gastight. Consequently, a third part consisting of an unbroken ring 28 is usually formed at the end of the neck and integrally joined in the molten state to the two parts 29a and 29b just above the location 24. The ring 28 has a slightly smaller diameter than the diameter of the parts 29a and 29b, although the outwardly facing surfaces of the parts 29a and 29b and the adjacent surface of the ring may be considered as forming a short cylindrical surface at the end of the neck 11.

In plastic containers there is not always a separate ring 28, and the mold line 27, which is almost invisible, may continue to the end 26. The outer surfaces of the parts 29a and 29b in such containers form a cylindrical surface with virtually no offset of the type shown in FIG. 1.

Figure 2:
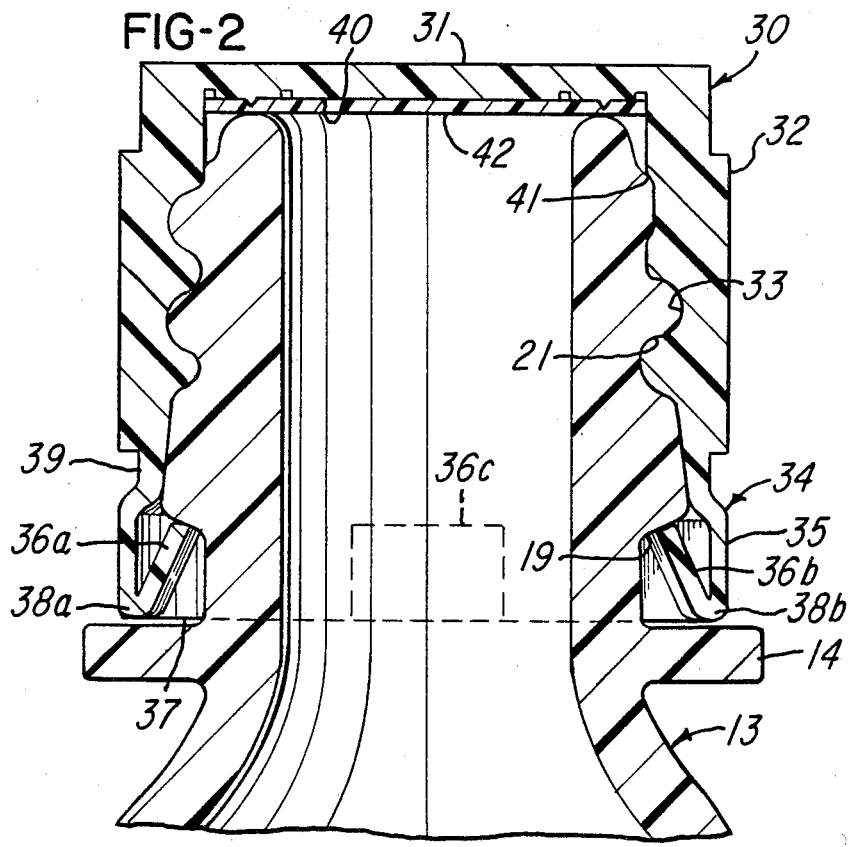
FIG. 2 is a cross-sectional view of the container neck of FIG. 1 and a closure produced according to this invention.

FIG. 2 is a cross-sectional view of the container 13 in FIG. 1 capped by a plastic closure 30 constructed according to this invention. The closure is molded as a one-piece structure of a suitable thermoplastic material, such as polyethylene or polypropylene or a copolymer. The main portion of the closure includes a top, or end, member 31, and a skirt 32 with an integrally molded internal thread 33 that conforms to the external thread 21.

At the bottom edge of the skirt 32 is a pilfer proof 34 that comprises: a ring, or band, 35; a plurality of inwardly directed hooks 36a–36c joined to the lower edge 37 of the ring by integrally molded hinge portions 38a and 38b; and a region 39 that joins the ring to the skirt 32. The thickness of the ring may be molded to be greater than the thickness of the hinge portions 38a and 38b so that the hinge portions will flex more easily than the ring and thus avoid breaking or tearing the ring 35 as the closure is threaded onto the neck 11. Furthermore, it is also desirable that the hinge portions 38a and 38b be more flexible than the respective hooks 36a and 36b in the radial direction so that the hooks will remain relatively straight as the closure is unscrewed from the container. This will be described in more detail hereinafter.

At the top of the inner surface of the skirt 32 immediately adjacent the under surface 40 of the top is an annular step 41 that engages the cylindrical region at the outer surface of the ring 28 near the end of the neck of the container. The radially inner surface of the step 41 forms a side seal to assist in making the junction between the closure and the container gastight. In the embodiment in FIG. 2, there is a relatively soft liner disk, or gasket, 42 to assist in sealing the container gastight.

FIG. 3 shows a side view of the closure 30. The outer surface of the skirt 32 is knurled or ridged to provide a good gripping surface. The relatively thin-walled section 39 is further weakened by several openings 44a–44d that define narrow bridges 50a–50d directly over the hooks 36a–36d, respectively, and wider bridges 50e–50h therebetween, and one edge of each of the openings 44a–44d is above one edge of a respective one of the hooks 36a–36c. In this embodiment, the weakened region that provides evidence of tampering consists of vertical, or more precisely, longitudinal, grooves, or scores, molded into the inner surface of the ring 35. In FIG. 3 only two of these grooves 45a and 45b are shown, and they are aligned with edges of the hook 36d. At no point is the depth of these grooves as great as the radial thickness of the ring 35. However, it is possible to form the grooves 45a and 45b and similar grooves adjacent the other hooks 36a and 36b so that the grooves do extend entirely through the ring over part of the axial length of the ring, thereby weakening the ring further. Such cutting through by virtue of greater groove depth should preferably be from the top of the ring down part of the way toward its end remote from the main portion of the closure 32.

FIG. 4 is a view of the closure 30 viewed along its axis from the end at which the pilfer-proof 34 is located. In this embodiment there are seen to be four hooks 36a–36d spaced equiangularly about the axis. Their radially innermost ends 46a–46d are at about the same distance from the axis as the innermost part of the step 41 and are curved to be concentric with the axis of the closure. Thus, the ends 46a–46d have a smaller radius of curvature than the hinge portions, 38a–38d. Theoretically, in a closure having four hooks, each hook could extend over an included angle of as much as 45°. That would allow all of the hooks to be formed in a mold with an inner part rotatable 45° about the axis. The part so rotated could then be withdrawn axially from the inner part of the closure. As may be seen, the grooves 45a and 45b adjacent the hook 36d, the grooves 45c and 45d adjacent the hook 36a, and corresponding grooves 45e and 45f adjacent the hook 36c and 45g and 45h adjacent the hook 36b, all extend deeply into the ring 35 to weaken it substantially so that it may be torn easily into segments, as will be described later.

The inner surface 40 of the top of the closure is better shown in the enlarged cross-sectional view in FIG. 5. Immediately adjacent the step 41 that forms a side seal with the cylindrical portion at the end of the neck 11 is an annular recess 47 in the surface 40. This recess is typically about 0.01" deep and about 0.01" wide and has an outer diameter of about 0.965" to about 0.985", equal to the inner diameter of the step 41. Concentric with the recess 47 is an annular rib 48 that projects slightly, e.g., about 0.01" from the surface 40 and typically has a V-shaped cross-section. Its purpose is to help anchor the liner 42 in place. Concentric with the recess 47 is another annular recess 49 that has about the same cross-sectional depth and width as the recess 47 in the surface 40 and is spaced inwardly from the recess 47 by approximately the wall-thickness, e g., about 0.065", of the end ring 28 at the end of the container.

FIG. 5 also shows the liner 42, which is about 0.03" thick, inserted in the closure 30 but not yet compressed by the annular surface at the end of the neck of a container. The closure 30 is shown being screwed onto the neck 11, and when this operation is complete, the end wall 26, which forms a rounded annular surface, will compress the liner against the surface 40, and the depending rib 48 will bite into the liner enough to anchor it against any radially inward shifting of the liner that might take place due to an extrusion force between the surface 26 and the juxtaposed annular part of the surface 40. The recesses 47 and 49 allow the elastomeric closure material to be squeezed out of the way to a slight degree, enough to help form a gastight seal across the end 26 of the container.

FIG. 6 shows a similar closure 30a that is not intended to be used with a liner and therefore does not have the annular rib 48. In the closure 30a, the annular grooves 47 and 49 allow slight radial bulging of the annular part of the closure material that forms the annular part of the end member 31 between them to take place. This improves the self-gasketing effect of the elastomeric closure 30a.

Figure 7:
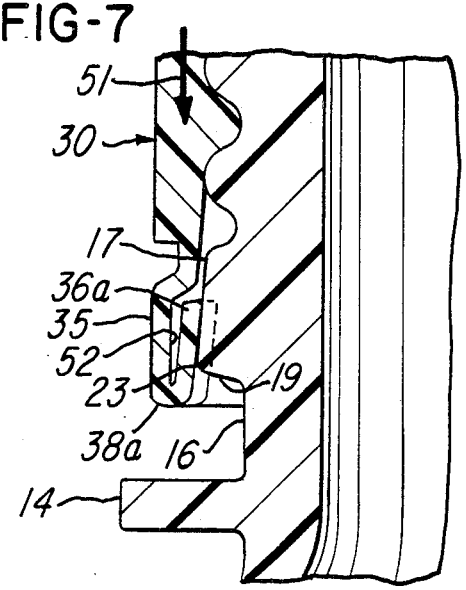
FIGS. 7–9 show cross-sectional views of fragments of the pilfer-proof in FIG. 3 in different positions relative to a container.

FIG. 7 shows the hook 36a being folded back toward the inner surface of the ring 35 by the bead 17 as the closure 30 moves downwardly in the direction of the arrow 51 when the closure is being screwed onto the container 12. The thickness of the hook is about 0.03" as is the thickness of the ring 35. Preferably almost all of the flexing takes place in the hinge region 38a as the hook moves past the largest part 23 of the bead 17. In order for the hook to have sufficient room to fold back out of the way of the bead, the inner surface 52 of the ring 35 should have a radius greater than the part 23 of the bead by at least substantially the thickness of the hook 36a.

Figure 8:
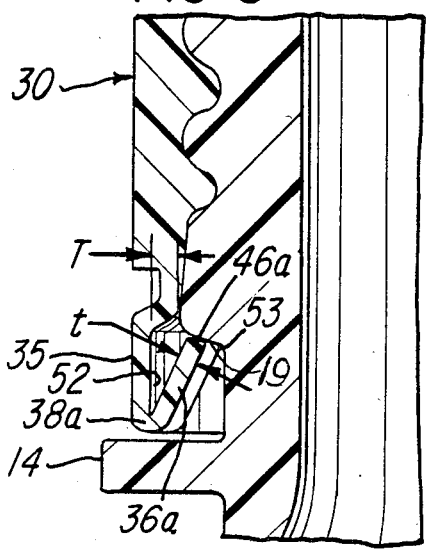

FIG. 8 shows the closure 30 fully in place with the hook 36a having sprung back to its normal position in which it extends substantially straight from the hinge region 38a to the end 46a and is directed inwardly and upwardly toward the end member 31 (not shown in this figure) of the closure. In this position the hook is engaged under the downwardly facing shoulder 19. The fact that the radius of at least that portion the inner surface 52 of the ring 35 juxtaposed with respect to the hook 36a is greater than the radius of the largest region 23 of the bead 17 by an amount T at least substantially as great as the thickness t of the hook 36a is illustrated by showing that, in this instance, T is greater than t.

The length of the hook from the hinge region 38a to the end 46a may be measured by the vector combination of its radial component and its axial component. The radial component is great enough to bring the end 46a well under the shoulder 19, and preferably close to the intersection 53 of the shoulder 19 and the neck portion 16, while the axial component is approximately equal to, but preferably slightly less than, the axial distance between the flange 14 and the shoulder 19.

It is important that the hook 36a not be folded back against the surface 52 by camming action of the shoulder 19 when the closure 30 moves up as it is removed from the container. Such camming action can be prevented by forming the hook 36a so that the included angle of the cone of which the hook 36a is a sector is at least as great as 180° minus the included angle of the cone that defines the substantially frusto-conical surface of the shoulder 19. If that restriction is followed, the hook 36a will intersect the shoulder 19 at least perpendicularly and, preferably, at an angle that will cam the end 46a toward the intersection 53 between the neck portion 16 and the shoulder. Thus, if the included angle of the somewhat frusto-conical surface of the shoulder 19 is 130°, the frusto-conical surface of which the hook 36a is one sector should have an included angle of 50°, or preferably greater, e.g., 60°. This is equivalent to saying that the angle of intersection of the hook 36a and the cylindrical ring 35 should be approximately 25° to 30°.

Figure 9:
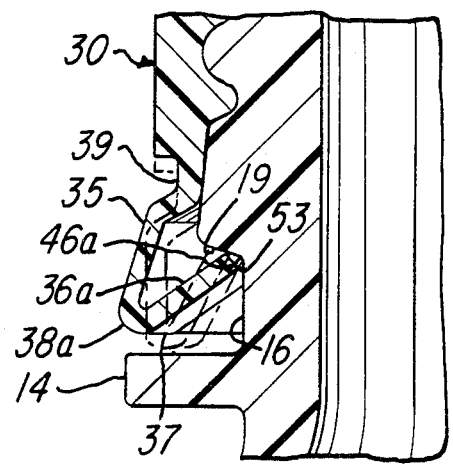

FIG. 9 shows the closure 30 being removed from the container. Because the hook is engaged under the shoulder 19 and is relatively inflexible compared to the hinge portion 38a, the upward movement of the main part of the closure 30 causes the end 46a of the hook 36a to engage against the intersection 53. The length of the hook from that end to the end at which the hinge portion 38a is located is longer than the radial dimension of the shoulder 19 and, therefore, is long enough to jack the lower edge 37 of the ring 35 outwardly.

The original, locked position of the hook 36a is shown in dotted lines, while the position following tearing of the ring 35 along the grooves 45c and 45d alongside the hook 36a in FIG. 9 is shown in solid lines. The longer the hook 36a is from the hinge region 38a to the end 46a, the farther outward the segment of the ring between the grooves 45c and 45d will be pushed and, thus, the greater will be the tensile force to rupture the ring at the grooves 45c and 45d. Of course, all of the hooks 36b–36d (FIG. 4) will be simultaneously undergoing the same pivotal movement as the hook 36a is shown undergoing in FIG. 9, thereby cooperatively increasing the total tensile stress in the ring 35.

The ring tears along the grooves 45 (FIG. 4) because the material there is only about 0.01" thick. Since the scores are on the inner surface, the resulting tears in the ring will be quite visible on the outside. After the ring has been torn at the grooves 45, the closure 30, with the ruptured pilfer-proof segments still attached by respective sections of the region 39, can be completely removed from the container and can later be screwed back on. When that is done, the hooks 36 may again engage the shoulder, but once the ring 35 has been torn, much less torque will be required to remove the closure 30 later. The lesser force required to unscrew the closure would also indicate that the closure had been previously removed. The ring 35 is attached to the lower edge of the skirt 32, which is about 0.05" thick, by the thin, flexible section 39 that forms the bridges 50 and that may be about 0.015" thick.

Figure 10:
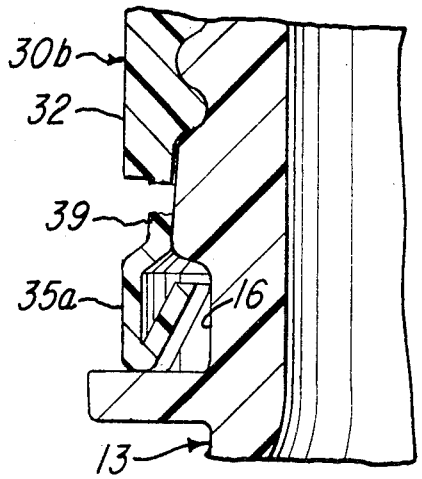
FIG. 10 is a cross-sectional view of a fragment of another embodiment of a pilfer-proof that has been ruptured.

The ring 35a in FIG. 10 has no scores like the scores 45. Instead, the region 39 is made thin enough and weak enough to rupture as the closure 30b is removed from the container 13. This leaves the ring 35a on the neck of the container encircling the neck region 16. Even if the closure 30b is screwed back on, the separation between the ring and the skirt 32 will be clearly visible.

Figure 11:
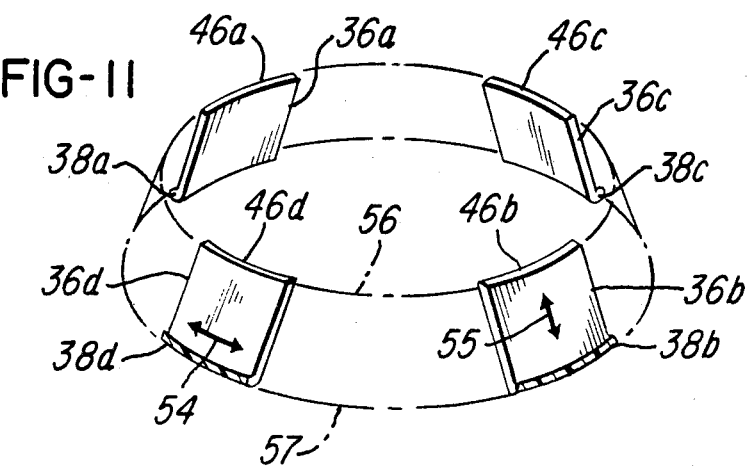
FIG. 11 is a perspective view of hooks as incorporated in the pilfer-proofs in FIGS. 7–10.

FIG. 11 shows the four hooks 36a–36d separately from any other part of a closure to illustrate the fact that they are essentially segments of a frusto-conical shell. Their frusto-conical curvature in the direction of the arrow 54 greatly strengthens them longitudinally in the direction of the arrow 55 to prevent their folding under the compressive force applied in the direction of the arrow 55.

FIG. 11 also makes it clear that the radius of curvature of the ends 46a–46d, which lie on the circle 56, is less than the radius of curvature of the ends at the hinge regions 38a–38d, which lie along the larger circle 57, since the radius of the circle 57 is slightly greater than the radius of the circle 56. This is not to say that the entire surface that defines each of the ends 46a–46d must lie in a single plane, although that is the way they are illustrated in this figure. However, forming the ends 46a–46d so that they are coplanar results in maximum contact between these ends and the shoulder 19 as shown, for example, in FIG. 8.

FIG. 12 shows a side view of the closure 30b, a fragment of which is shown in FIG. 10. In order to have the ring 35a separate from the skirt 32 as easily as possible, openings 58 that divide the region 39 into bridges 59 are made larger than the openings 44a–44d in FIG. 3. One of the bridges 59a–59d is directly aligned with each of the hooks 136a–136d as illustrated in FIG. 13. The bridges 59a–59d comprise the thin plastic material that defines the ends of the openings 58 and joins the ring 35a to the skirt 32. By making these bridges very slender, for example, about 0.015" by about 0.03", they can be ruptured relatively easily as the closure 30b is unscrewed from a container.

FIGS. 13 and 14 show two different hook configurations. The sides 61a and 61b of the hook 136a (and corresponding sides of each of the other hooks 136b–136d) in FIG. 13 are defined substantially by radial planes emanating from the axis of the closure 30b. On the other hand, the closure 30c in FIG. 14 has the same type of hooks 36a–36d shown in FIG. 11, for example. The sides 62a and 62b of the hook 36a (and corresponding sides of each of the other hooks 36b–36d) are defined by substantially parallel planes. As a result, the hooks 136a–136d can have a greater included angle α at the hinge portion 138a than can the hooks 36a–36d. The reason is that each hook is partly defined by a mold portion, and, as will be described later, there must be relative rotation to bring this mold portion out from behind each hook to the space between adjacent hooks in order to extract the newly formed closure from the mold. The extra width of the corners of the hooks 36a–36d in FIG. 14 means that the space between each pair of hooks is more limited than is the case of the hooks 136a–136d in FIG. 13.

It is also appropriate to note that each hook, in either FIG. 13 or FIG. 14, subtends a central angle α having its apex at the axis of the closure, the angle not being substantially smaller than 33° and not greater than a number of degrees equal to 180 divided by the number of hooks. Thus, if there are only two hooks 36a and 36b or 136a and 136b, they can each subtend a maximum angle α of 90°. If there are five hooks, they can each subtend an angle as great as 36°. If the subtended angle is too small, there will be insufficient strengthening of the hooks, due to limitation of their frusto-conical curvature.

FIG. 14 also shows another embodiment of the pilfer-proof ring 35b in which one of the bridges, bridge 63, is substantially wider and, therefore, stronger than the other bridges 65. It should be noted that there are more bridges 65 in FIG. 14 than the number of bridges 59a–59d in FIG. 13 and there are two bridges 65 over each hook 36a–36d. Preferably, there is one of the bridges 65 over each edge of each hook. Diametrically opposite the bridges 63 is a slot 64 that weakens the ring 35b and allows it to be torn apart easily as the closure is unscrewed from a container. Thereafter the torn ring 35b will dangle from the remaining bridge 63, making it quite clear that the closure has been removed from the container.

FIGS. 15 through 21 show a mold to make the closures of the foregoing figures. The outer components of the mold, as shown in FIG. 15, may consist of two main, outer portions: an upper and lower portion 66a and 66b, as shown, to form all of the exterior surfaces of half of the closure 30. After molding the closure, the upper portion 66a may be moved axially away. The lower portion is divided into left and right half shells, which can then be separated by opposite lateral movement. The openings in the thin region 39 may be formed by several separate members, of which only member 67 is shown, movable laterally with respect to the axis. Alternatively, in a mold to form the closure 30b in FIGS. 12 and 13 that has only one bridge for each hook, the members 67 may be rigidly affixed to the respective half shell, provided the cross-sectional shape of the bridges (for example, the bridges 59a–59d in FIG. 13 has no re-entrant surfaces to hinder such linear movement of the members 67, i.e., surfaces not "visible" directly from the left or right. As a further alternative, the outer shell may be divided into more than two parts.

Within the shell 66, and defining the interior surfaces of the closure 30, are three main internal mold members 68–70. The upper member 68 primarily defines the thread 33 and other interior surfaces of the main part of the closure 30, and the two lower members 69 and 70 define interior surfaces of the pilfer-proof 34.

FIG. 21 shows the members 68–70 separated axially, as they would be after extracting the closure 30 from the mold. The upper member 68 has a central axle 72 that extends through a hole 73 in the member 69. The latter has four wing-like projections 74a–74d that define generally outwardly facing frustoconical convex surfaces of the hooks and also define inwardly facing portions of the surface 52 (FIG. 15) of the ring 35 juxtaposed with respect to the respective hooks. The generally outwardly facing surface 76a of one of the hooks 36a is shown in FIG. 16.

FIG. 21 also shows the member 70 as being in the form of a short tube with recesses 77a–77d. Surfaces 78a–78d of the projections form parts of the surface 52 of the ring 35 and surfaces 79a–79d of the tube 70 form the remainder of the inner surface 52 of the ring. While the radius of curvature of the surfaces 79a–79d could be greater than the radius of curvature of the surfaces 78a–78d, they preferably have the same radius of curvature. The surfaces 79a–79d cannot have a radius substantially smaller than that of the surfaces 78a–78d.

The surfaces 80a and 80d in the recesses 77a and 77d form the generally inwardly facing surfaces, such as the surface 81a of the hook 36a in FIG. 15. The surfaces 80a and 80b and similar surfaces in the recesses 77c and 77d can have frusto-conical curvature, but if the subtended angle of the hooks formed in these recesses is not too great, the surfaces 80a and 80b need not be frusto-conically curved.

FIG. 16 shows the closure 30 with the outer shell 66 in FIG. 15 removed. The next step in extracting the closure from the mold is to separate the member 70 from the closure 30 and the members 68 and 69 by linear relative movement, equivalent to moving the member 70 in the direction of the arrow 84, as shown in FIG. 17. Thereafter relative rotary movement between the closure 30 and the member 69 in the direction of the arrows 82 and 83, as shown in FIGS. 18 and 19, moves the projections 74a–74d out from behind the hooks. It is this rotary movement that requires the various surfaces of the hooks 36a–36d and juxtaposed parts of the surface 52 to be surfaces of revolution.

Finally, the closure and the member 68 are separated by relative linear movement according to the arrow 85 in FIG. 20 or by helical movement that also moves the member 68 in the same direction. For this purpose the lower surface 86 of the member 68 is conically shaped with an included angle less than the supplement of the included angle of the hooks 36. Thus, if the hooks have an included angle of 60°, the included angle of the surface 86 must be less than 120°. This allows the surface 86 to cam the hooks out of the way and permit downward movement of the member 68.

A fin 87 is shown on the mold part 70. This fin would be required to form one of the slots 45 if the closure being molded were the closure 30 in FIG. 4. In fact, there would have to be such a fin adjacent each side of each recess 77a–77d to form that type of closure. However, no such fins are required to form the closure 30 in FIGS. 12 and 13. A similar fin midway between two of the recesses 77a–77d would be required to mold the slot 64 in FIG. 14.

We claim:

1. A molded, one-piece plastic closure for attachment gas-tight to a container having a body, a threaded neck extending from the body, and a bead extending outwardly from the neck between the threaded portion and the body and having a shoulder facing the body and extending from the intersection with the neck out to the outer part of the bead, said closure comprising:
   (1) an end member;
   (2) a generally cylindrical skirt integrally molded with the end member and extending away from the end member, the skirt comprising an internal thread to engage the neck; and
   (3) a pilfer-proof molded integrally with the closure at the edge of the skirt remote from the end member and comprising:
      (a) a ring,
      (b) means comprising at least one region of the pilfer-proof weaker than immediately adjacent regions of the pilfer-proof to be visibly torn by force exerted thereon by the removal of the closure from the container, and
      (c) a plurality of hooks to engage the shoulder when the closure is being unscrewed from the container, each of the hooks comprising:
         (i) a main portion in the form of a sector of a generally frusto-conical shell that has a generally inwardly facing surface and a frusto-conical convex generally outwardly facing surface extending longitudinally between a first curved edge of larger radius of curvature at one axial end of the shell and a second curved edge of smaller radius of curvature at the opposite axial end of the shell, the frusto-conical shape making each sector substantially impervious to bending in response to compressive force exerted longitudinally along the shell and of smaller magnitude than the compressive force that must be exerted thereon of sufficient magnitude to tear the weakened region, each of the sectors extending inwardly from the edge of the ring remote from the skirt and at an angle toward the end member, the convex surface of each sector facing generally outwardly toward a respective portion of the inwardly facing surface of the ring, and
         (ii) hinge means integrally molded with the first curved edge of the respective sector and with a part of that edge of the ring which is remote from the skirt, whereby the hinge means joins the first edge of the respective sector to the ring, the hinge means being sufficiently flexible with respect to the ring to allow the respective sector to pivot substantially only toward and away from a respective portion of the inwardly facing surface of the ring, the respective portion of the inwardly facing surface of the ring being spaced from the axis by a distance not substantially greater than the radius of the outer part of the bead plus the thickness of the frusto-conical shell, whereby each of the hooks can be pivoted to a position such that its generally inwardly facing surface is spaced from the axis by a distance at least substantially as great as the outer part of the bead.

2. The closure of claim 1 in which each of the hooks subtends a central angle that has its apex at the axis of the closure and is not substantially smaller than 30° and not greater than a number of degrees equal to 180/N, where N is the number of hooks.

3. The closure of claim 2 in which each of the hooks subtends an angle greater than 30° and less than about 40° and there are four of said hooks.

4. The closure of claim 1 in which the arcuate width of each hinge means is approximately equal to the arcuate width of the respective sector.

5. The closure of claim 4 in which the thickness of each hinge means is not substantially greater than the average thickness of the respective sector.

6. The closure of claim 1 in which:
   the container comprises a flange axially spaced from the shoulder and extending outwardly from the neck between the bead and the body; and
   the ring is in the form of a short cylindrical band having an axial length approximately equal to the axial distance between the shoulder and the flange on the neck of the container.

7. The closure of claim 6 in which the maximum axial component of the length of each of the sectors between the end edges thereof is approximately equal to the axial distance between the shoulder and the flange on the neck of the container.

8. The invention of claim 1 in which the weakened region comprises a plurality of thin bridges of the elastomeric material integrally molded between the skirt and the ring.

9. The closure of claim 1 in which there is at least one said weakened region for each said hook, and each said weakened region is a substantially longitudinal groove in the ring.

10. The closure of claim 9 in which each said groove is on the inwardly facing surface of the ring.

11. The closure of claim 9 comprising flexible means joining the ring to the skirt to support segments of the ring pivotally after the weakened regions have been torn.

12. The closure of claim 11 in which the flexible means comprises a thin-walled portion of the plastic integrally molded between the edge of the skirt and the proximal edge of the ring.

13. The closure of claim 12 in which the thin-walled portion is separated into individual bridges, each extending between a respective part of the edge of the skirt and a respective one of the segments of the ring.

14. The closure of claim 1 in which the maximum length from the first curved edge of each of the sectors to the second curved edge thereof is greater than the radial distance from the outermost part of the bead to the adjacent part of the neck.

15. The closure of claim 1 in which the weakened region comprises a plurality of slender bridges of the plastic material integrally molded between the skirt and the ring, the minimum cross-sectional area of each of the bridges being substantially less than the cross-sectional area of each of the sectors, whereby the tensile force required to break the bridges will be less than the force required to fold the sectors during removal of the closure from the container.

16. The closure of claim 1 in which the thickness of the plastic material comprising each of the hinge means is less than the thickness of the adjacent part of each of the respective sectors, whereby the flexiblity of each of the hooks is confined to the respective hinge means thereof.

* * * * *